(12) United States Patent
Lin

(10) Patent No.: US 6,392,976 B1
(45) Date of Patent: May 21, 2002

(54) LOADER TRAY FOR ELIMINATING VIBRATION AND RESONANCE EFFECT

(75) Inventor: Hung-Jui Lin, Taipei (TW)

(73) Assignee: EPO Science & Technology Inc. (TW)

( * ) Notice: Subject to any disclaimer, the term of this patent is extended or adjusted under 35 U.S.C. 154(b) by 0 days.

(21) Appl. No.: 09/567,092

(22) Filed: May 8, 2000

(30) Foreign Application Priority Data

May 21, 1999 (CN) .......................................... 99211890 U

(51) Int. Cl.[7] ............................................. G11B 17/032
(52) U.S. Cl. ..................... 369/77.1; 369/75.1; 369/75.2; 369/77.2
(58) Field of Search .............................. 369/77.1, 77.2, 369/75.1, 75.2; 360/99.02, 99.03, 99.06, 99.07

(56) References Cited

U.S. PATENT DOCUMENTS

| | | | | |
|---|---|---|---|---|
| 5,596,561 A | * | 1/1997 | Toyoguchi | ................. 369/77.1 |
| 6,002,658 A | * | 12/1999 | Aso et al. | ................. 369/75.1 |
| 6,151,285 A | * | 11/2000 | Watanabe et al. | ........... 369/77.1 |
| 6,169,720 B1 | * | 1/2001 | Kamemura et al. | ........ 369/75.2 |
| 6,212,156 B1 | * | 4/2001 | Matsumoto et al. | ........ 369/192 |
| 6,256,278 B1 | * | 7/2001 | Furukawa et al. | .......... 369/77.1 |

* cited by examiner

*Primary Examiner*—Allen Cao
*Assistant Examiner*—Dzung C. Nguyen
(74) *Attorney, Agent, or Firm*—Troxell Law Office PLLC

(57) ABSTRACT

A loader tray for eliminating disk vibration and resonance effect has recessions with an opening for placing disks for available for a disk to be read/recorded and hollow parts for balancing the air pressure are provided at the recession of the tray. Therefore, a steady disk can be obtained in a state of high rotation speed and a reading/recording job can be performed effectively in the loader.

5 Claims, 4 Drawing Sheets

LOADER TRAY FOR ELIMINATING VIBRATION AND RESONANCE EFFECT

BACKGROUND OF THE INVENTION

1. Field of the Invention

The present invention relates to a loader tray eliminating disk vibration and resonance effect, and particularly to an improved loader tray for a disk, with which a disk can prevent from vibration and resonance effect.

2. Description of Related Art

A disk loader has been widely applied as a media of reading/recording video data for a personal computer, a compact disk audio, a video compact disk driver, and etc. The disk loader comprises a tray for locating a disk. The tray may move outward from the loader for placing or taking out the disk and then retract back to the original position such that a job of reading/recording video data can be performed successively. When a conventional tray is used, the disk thereon can be rotated steadily in a low speed without any reading/recording problem. But, once the rotating speed of the disk is high, the air pressure generated at the bottom of the disk causes the disk in a state of unbalance. As a result, a phenomenon of disk vibration and resonance effect occurs so that a reading/recording head is unable to keep a constant distance to the surface of the disk. The job of reading/recording becomes not possible to proceed smoothly under this circumstance. This is a problem raised by the conventional tray and it is necessary to overcome the problem or the speed of reading/recording data on a disk is hard to be increased effectively.

SUMMARY OF THE INVENTION

An object of the present invention is to provide a loader tray, which is possible to eliminate a phenomenon of disk vibration and resonance effect.

Another object of the present invention is to provide a loader tray, which is possible to offer a disk of a high rotation speed steadily and to speed up a job of disk reading/recording.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Figure 1:
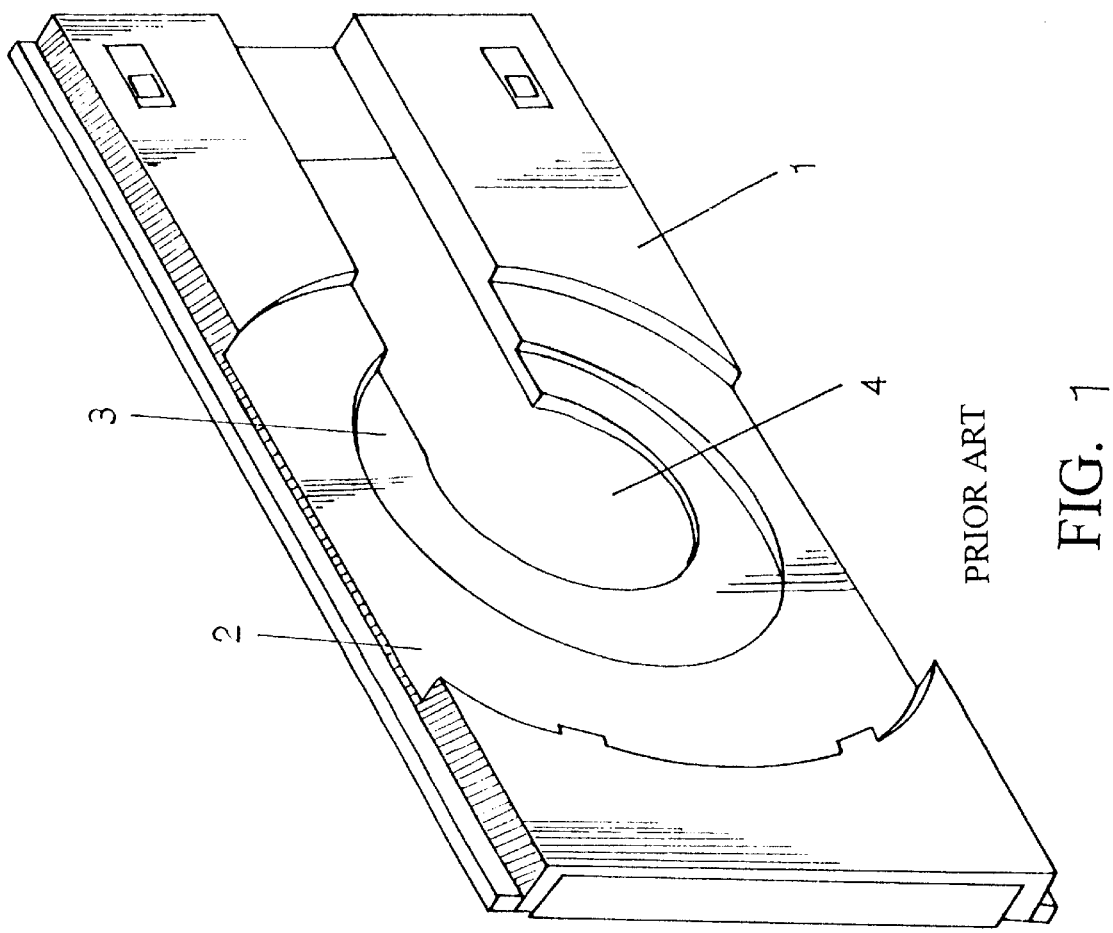
FIG. 1 is a perspective view of a conventional loader tray.

Referring to FIG. 1, a conventional loader tray 1 mainly comprises a first recession 2, a second recession 3 and an opening 4. The first recession 2 has a greater area for placing a big size's disk and the second recession 3 has a smaller area for placing a small size's disk. The opening 4 is provided for a driver to rotate a disk and for a loader head to read/write data on the disk. The opening 4 is the only hollow part on the tray 1 and the rest part thereof is enclosed completely. When the disk is in a state of high rotation speed, an extremely great air pressure is generated between the tray and the rotating disk and the design of only one opening 4 makes the bottom of the disk occur an unbalancing air pressure. Therefore, it is easy to result in a phenomenon of vibration disk and a resonance effect and it is much more apparent especially for a softer disk. It is worth to note that a vibration disk and a resonance effect seriously affect the quality of reading/recording disk or even more, it makes the reading/recording job not possible to execute normally.

Figure 2:
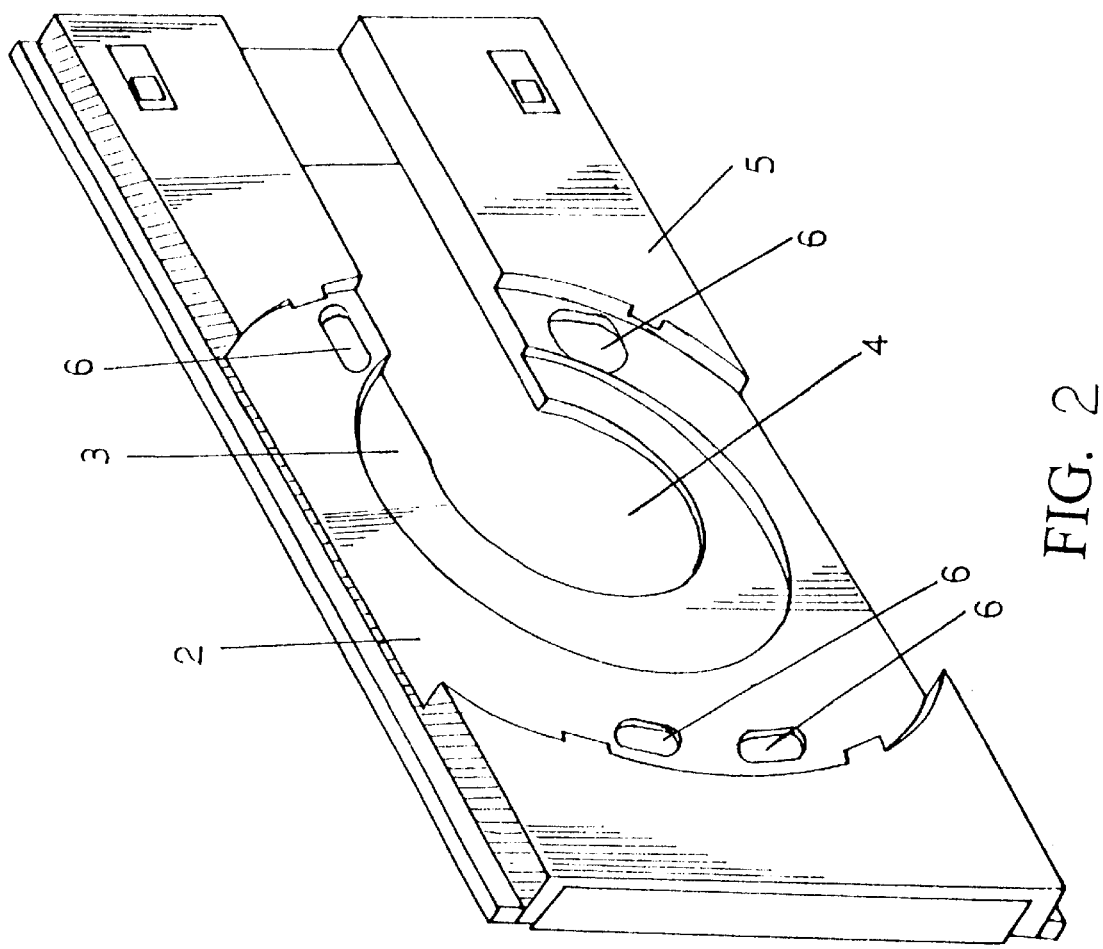
FIG. 2 is a perspective view of a loader tray in a first embodiment of the present invention.

Referring to FIG. 2, a loader tray 5 in the first embodiment of the present invention is illustrated it has a great difference from the conventional tray 1. There are four hollow parts 6 are provided at the first recession 2 in addition to the opening 4. Two of the hollow parts 6 are disposed between the border of the recession 2 near the outer side of the tray 5 and the opening 4 to be opposite to the opening 4. Another two hollow parts 6 are disposed by the border of the recession 2 near the inner side of the tray 5 and by the opening 4. Due to the hollow parts 6 being arranged on the recession 2, the air may move in and out through the opening 4 and the hollow parts 6 in case of the disk on the tray 5 being in a state of high rotation speed. Thus, the air pressure generating at the bottom of the disk because of the high rotation speed of the disk causes the disk a much more steady rotation such that it is not possible for the disk to occur a phenomenon of vibration and a resonance effect accordingly.

The tray 5 in the first embodiment of the present invention has been tested in a high rotation speed by the present inventor for many times and the testing results appear the tray 5 can eliminate the phenomenon of the disk vibration and the resonance effect definitely. Especially, a prominent result can be obtained for a softer disk on the tray 5. It is found that the hollow parts 6 are close to the border of the first recession 2 and opposite to the opening 4 may appear a better result. In addition, the hollow parts 6 can be arranged in a shape of circle, rectangle, triangle, polygon, and etc.

Figure 3:
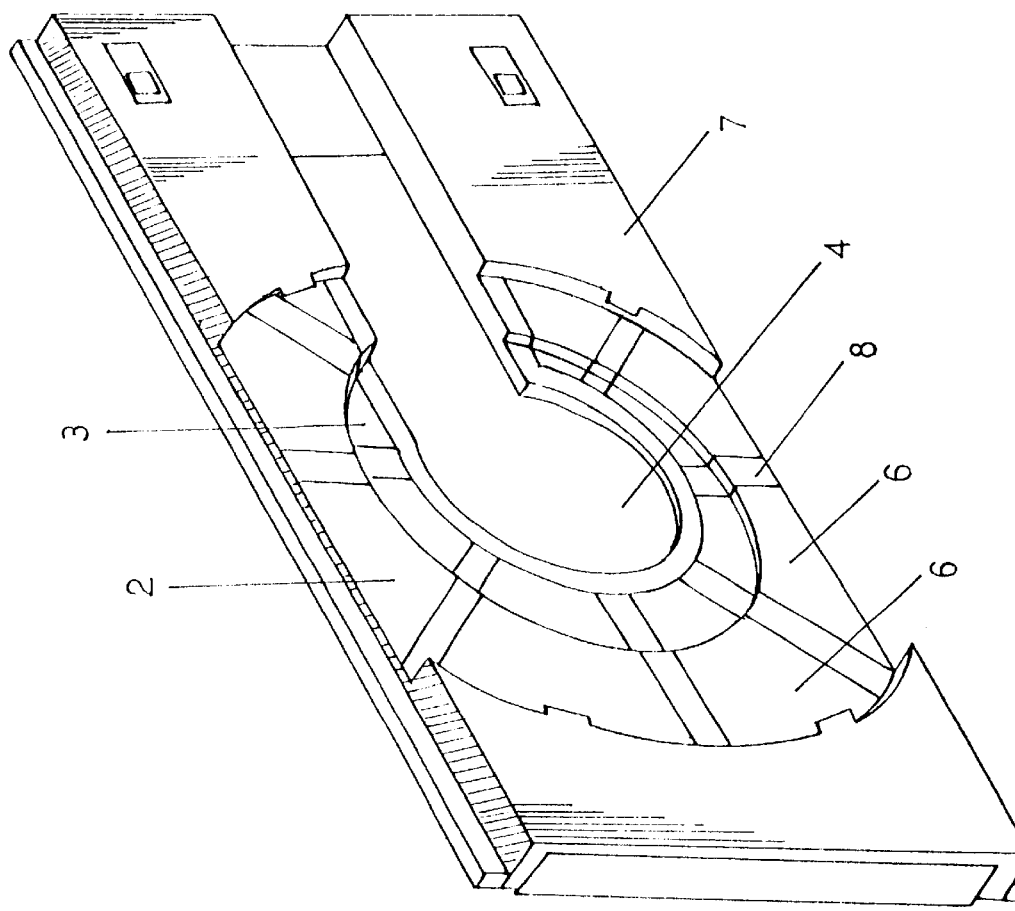
FIG. 3 is a perspective view of a loader tray in a second embodiment of the present invention.

Referring to FIG. 3, a tray 7 in the second embodiment of the present invention is illustrated. The tray 7 is provided with radial ribs 8 across the first recession 2 and the second recession 3 and hollow parts 6 are formed once the disk is placed on the tray. Therefore, the hollow parts 6 make the air pressure generated by a disk of high rotation speed helpful for a steady rotation of the disk such that the phenomenon of disk vibration and resonance effect can be avoided substantially.

Figure 4:
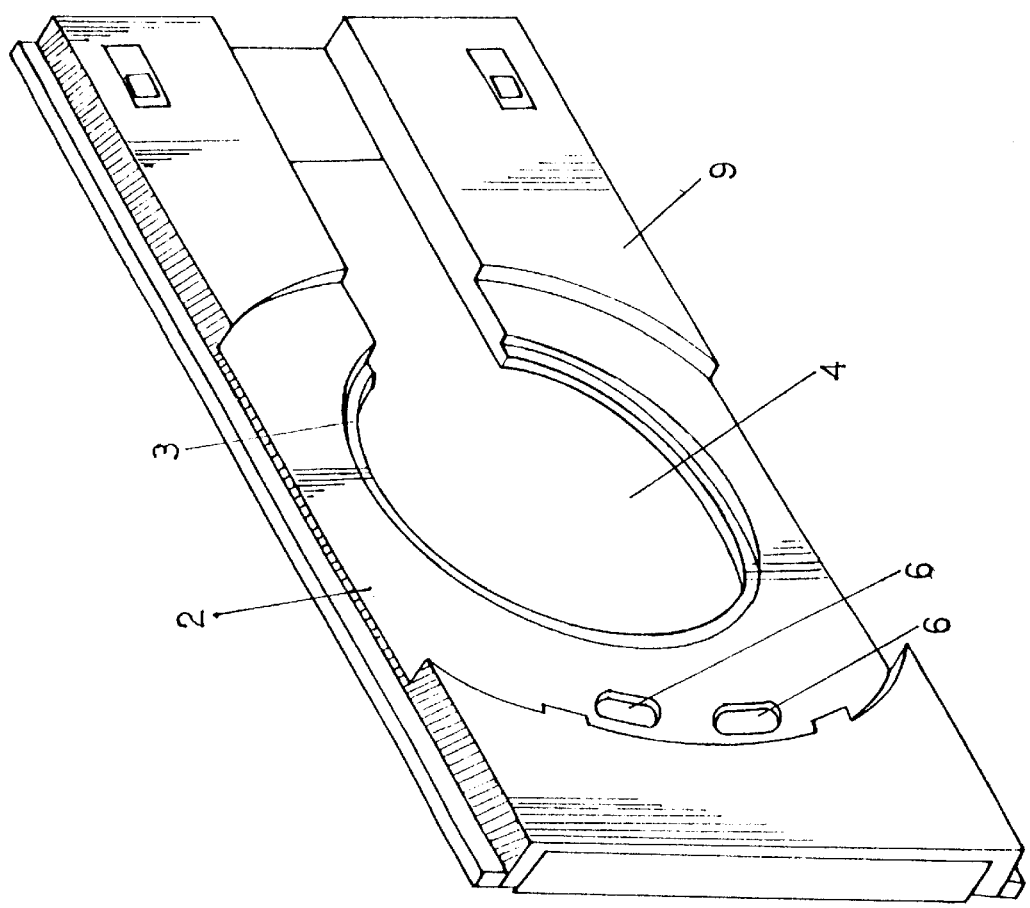
FIG. 4 is a perspective view of a loader tray in a third embodiment of the present invention.

Referring to FIG. 4, a tray 9 in the third embodiment of the present invention is provided with an enlarged opening 4 such that the second recession 3 is reduced. Although the second recession 3 is reduced, it is required to keep an enough area for loading a small disk.

The recession on a loader tray, that is the disk placing area, is provided with hollow parts to generate a balancing air pressure in addition to the opening for rotating and reading/recording the disk. It has to be emphasized that the feature described above is novel absolutely. Although Taiwanese Patent Publication No. 325186 entitled "TRAY TYPE OF CD-ROM" has disclosed a second opening at a recession (i.e. the disk placing area) on a tray, the second opening is used for mounting fastening device. It is noted that the second opening provides a purpose and a function different from the hollow parts disclosed in the present invention. Moreover, it is appreciated that the present invention can eliminate disk vibration and resonance effect in a state of high rotation speed. In this way, a stable reading/recording job for the disk can be proceeded steadily so that a faster speed of data reading and writing is able to reach and to save a lot of operation time.

While the invention has been described with reference to preferred embodiments thereof, it is to be understood that modifications or variations may be easily made without departing from the spirit of this invention, which is defined by the appended claims.

What is claimed is:

1. A loader tray for a disk reader/recorder eliminating disk vibration and resonance during reading/recording and comprising:

a) a first recession recessed below a surface of the loader tray, the first recession configured to receive therein a disk having a first size and having a first disk supporting surface, the first recession located between opposite inner and outer ends of the loader tray;

b) a second recession located within the first recession and recessed below the first disk supporting surface, the second recession configured to receive therein a disk having a second size smaller than the first size, and having a second disk supporting surface;

c) a driver opening extending through the tray and located in the second recession; and, d) a plurality of hollow portions formed in the first disk supporting surface within an outer boundary of the first recession, the plurality of hollow portions spaced apart and located at least between the second recess and the outer end of the loader tray adapted to relieve air pressure between the loader tray and a disk in the first recession thereby eliminating vibration and resonance.

2. The loader tray of claim 1 wherein the plurality of hollow portions include a first plurality of hollow portions in the first recession between the second recession and the outer end of the loader tray and a second plurality of hollow portions in the first recession between the second recession and the inner end of the loader tray.

3. The loader tray of claim 1 wherein the plurality of hollow portions are located in the first recession on opposite sides of the drive opening.

4. The loader tray of claim 1 wherein the plurality of hollow portions are located between ribs extending radially from the drive opening to an outer boundary of the first recession.

5. The loader tray of claim 1 wherein the plurality of hollow portions are located adjacent to the outer boundary of the first recession.

* * * * *